United States Patent
Lee et al.

(10) Patent No.: US 7,417,347 B2
(45) Date of Patent: Aug. 26, 2008

(54) SKELETON TYPE BLDC MOTOR

(75) Inventors: Ho-Jae Lee, Gyeongsangnam-Do (KR); Dong-Il Lee, Gyeonggi-Do (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/102,766

(22) Filed: Apr. 11, 2005

(65) Prior Publication Data

US 2006/0226715 A1    Oct. 12, 2006

(51) Int. Cl.
   *H02K 37/16*    (2006.01)
   *H02K 21/18*    (2006.01)

(52) U.S. Cl. .................. 310/156.46; 310/193; 310/261; 310/156.38

(58) Field of Classification Search ............ 310/156.46, 310/193, 49 R, 254, 261, 40 MM, 156.38, 310/156.45
   See application file for complete search history.

(56) References Cited

U.S. PATENT DOCUMENTS 2,601,517 A * 6/1952 Hammes ..................... 310/172
2,784,331 A * 3/1957 Rodemann ................... 310/162
3,344,378 A * 9/1967 Wilhelmson ................. 335/272
4,329,601 A * 5/1982 Mai .......................... 310/49 R
4,691,132 A   9/1987 Bertram et al.
5,465,019 A * 11/1995 Kliman ................... 310/156.04
6,713,921 B2 * 3/2004 Sebastian et al. ....... 310/156.38
2004/0239200 A1  12/2004 Strahan

FOREIGN PATENT DOCUMENTS

JP    2005295775 A  * 10/2005
WO    03/021753      3/2003

* cited by examiner

*Primary Examiner*—Karl Tamai
*Assistant Examiner*—David W. Scheuermann
(74) *Attorney, Agent, or Firm*—Greenblum & Bernstein, P.L.C.

(57) ABSTRACT

A rotor of a BLDC motor includes: a rotor divided into a north pole and a south pole on the basis of a magnetic pole separating line; and a stator at which the rotor is disposed with an air gap, the stator having a first pole shoe, a second pole shoe and a pair of detent grooves at its inner surface, wherein an air gap forming portion for enlarging an air gap between the rotor and the detent grooves is formed at both end portions of the rotor where the magnetic pole separating line passes, so that the rotor can maintain the motor performance and reduce resonance noise by reducing only higher degree of cogging torque from cogging torque generated when the motor is driven.

5 Claims, 5 Drawing Sheets

SKELETON TYPE BLDC MOTOR

BACKGROUND OF THE INVENTION

1. Field of the Invention

The present invention relates to a skeleton type BLDC motor, and more particularly, to a BLDC motor which reduces resonance noise by reducing cogging torque.

2. Description of the Background Art

FIG. 1 is a perspective view of a skeleton type BLDC motor in accordance with the conventional art, FIG. 2 is a cross-sectional view of a skeleton type BLDC motor in accordance with the conventional art; and FIG. 3 is a cross-sectional view taken along line III-III of FIG. 2.

The conventional BLDC motor is made up of a stator 102 to which the power is applied; a rotor 104 disposed at an inner circumferential surface of the stator 102 with an air gap and rotated by interlocking with the stator 102; and a rotary shaft 106 mounted at the center of the rotor 104 and rotated together with the rotor 104, for transferring a rotary force to the outside.

A PCB 108 having a driver circuit for driving the rotor 104 therein is installed at one side of the stator 102, and the PCB 108 is embedded in a PBC cover 110.

The stator 102 is made up of a stator core 116 in which a plurality of sheets are laminated and coupled by a rivet, and in which a first pole shoe 112 and a second pole shoe 114 which accommodate the rotor 104 are formed as one body; a pair of bobbins 118 and 120 fixed to the stator core 116; and a pair of coils 122 and 124 wound on the pair of bobbins 118 and 120, respectively, the pair of coils to which the power is alternately applied.

For the initial starting, detent grooves 126 disposed symmetrically to the rotary shaft line of the rotor 104 are respectively formed at the first pole shoe 112 and the second pole shoe 114 in order that the rotor is not aligned at a position where torque of the rotor is zero.

As shown in FIG. 4, the rotor 104 includes: a circular magnet 130 whose one side is a north pole and the other side is a south pole on the basis of a magnetic pole separating line formed radially from the center of the rotor 104; and a magnet frame 132 disposed at an inner circumferential surface of the magnet 130 and having a rotary shaft 106 fixed to its center.

The rotor 104 is accommodated inside a motor housing 140, and a pair of bearings 142 and 144 rotatably supporting the rotary shaft 106 are disposed at the motor housing 140.

A location detecting sensor (not shown) for detecting a rotary location of the rotor 104 is disposed at the PCB cover 110, and the location detecting sensor is received in a sensor receiving portion 136.

An operation of the BLDC motor in accordance with the conventional art having such a construction will be described. When the power is applied, the location detecting sensor detects a rotary location of the rotor 104 by using information of the magnetic pole part line 128 of the rotor 104, and the DC power is applied to one of the pair of coils 122 and 124 on the basis of the detection result. Then, the stator core 116 is excited to rotate the magnet 130. Then, the magnet frame 132 mounted on the magnet 130 is also rotated, and the rotary shaft 106 fixed to the magnet frame 132 is rotated.

At this time, the rotor 140 is not aligned to a position where torque is zero by means of the detent grooves 126 formed to have a large interval relatively to the first pole shoe 112 and the second pole shoe 114.

However, in the conventional skeleton type BLDC motor having such a construction, cogging torque, which is a tangential force whose tendency is to move in equilibrium with the minimum magnetic energy, is inevitably generated. Such cogging torque is generated between the first pole shoe and the second pole shoe regardless of the current.

In addition, when the magnetic pole separating line of the rotor passes the detent grooves by the rotation of the rotor, an air gap between the rotor and the stator changes and therefore magnetic flux density changes. Hereupon, higher degree of cogging torque as well as basic degree of cogging torque is generated. The cogging torque of higher degree becomes the main cause of resonance noise of the motor, thereby increasing noise of the motor.

In order to reduce the generation of the cogging torque, though research and development in noise reduction has been a primary focus by using a method for improving a magnetizing method of the magnet or a method for reducing the vibration source by changing a shape of the magnet, there is a problem that basic degree cogging torque as well as higher degree (the fourth degree, fifth degree, . . . ) cogging torque is reduced. Thus, there is a problem that the performance of a motor which requires a certain level of cogging torque is deteriorated.

SUMMARY OF THE INVENTION

Therefore, an object of the present invention is to provide a BLDC motor capable of maintaining the motor performance and reducing resonance noise by reducing only higher degree of cogging torque from cogging torque generated from when the motor is driven.

To achieve these and other advantages and in accordance with the purpose of the present invention, as embodied and broadly described herein, there is provided a BLDC motor, comprising: a rotor divided into a north pole and a south pole on the basis of a magnetic pole separating line; and a stator at which the rotor is disposed with an air gap, the stator having a first pole shoe, a second pole shoe, and a pair of detent grooves at its inner surface, wherein an air gap forming portion made by removing a certain width of both end portions of the rotor from the round circular form, for enlarging an air gap between the rotor and the detent grooves is formed at both end portions of the rotor where the magnetic pole separating line passes.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to one embodiment of a rotor of a BLDC motor in accordance with the present invention, examples of which are illustrated in the accompanying drawings.

There can be a plurality of embodiments of the rotor of the BLDC motor in accordance with the present invention, of which the most preferred one will now be described.

Figure 1:
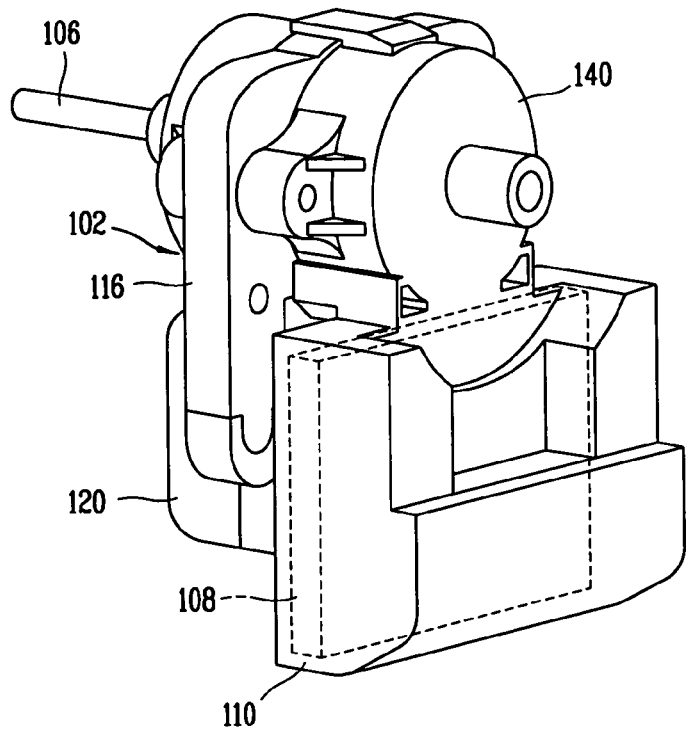
FIG. 1 is a perspective view of a skeleton type BLDC motor in accordance with the conventional art.
Figure 2:
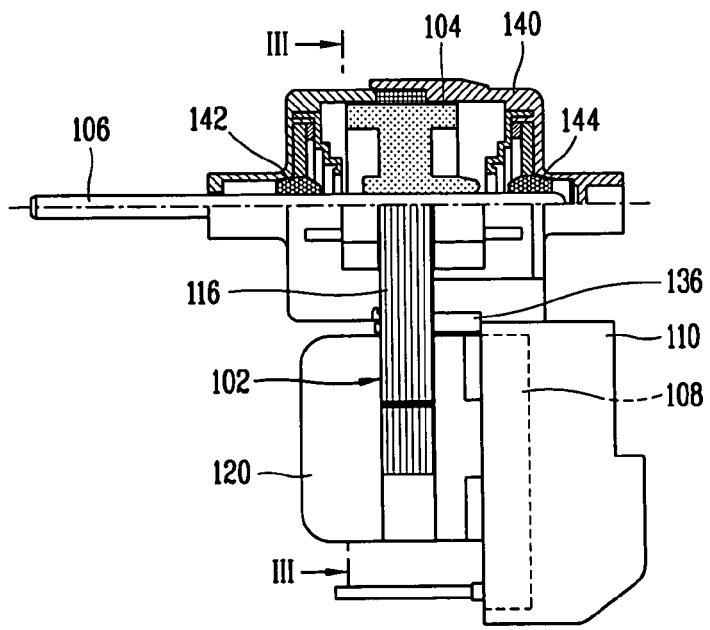
FIG. 2 is a cross-sectional view of a skeleton type BLDC motor in accordance with the conventional art.
Figure 3:
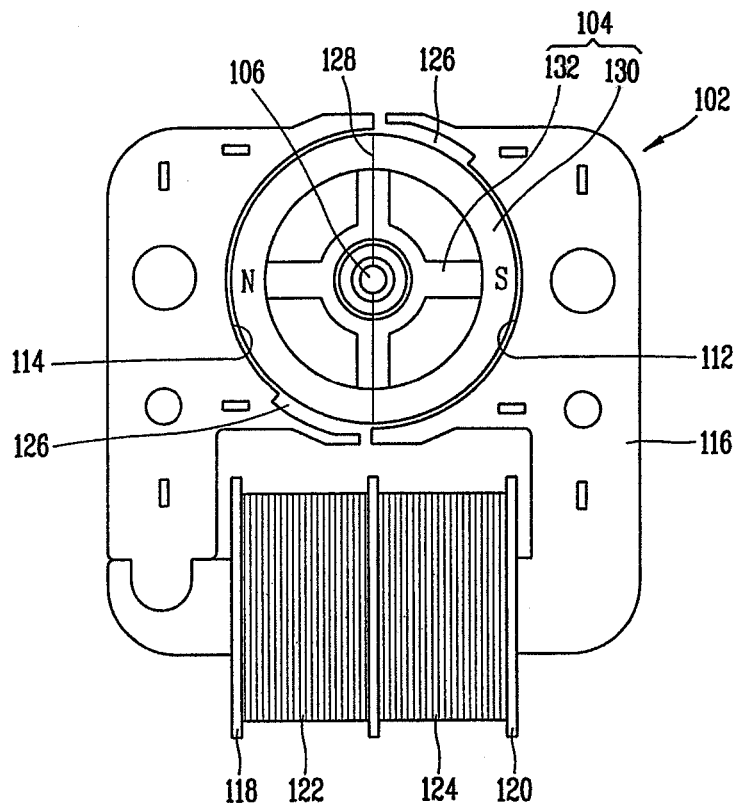
FIG. 3 is a cross-sectional view taken along line III-III of FIG. 2.
Figure 4:
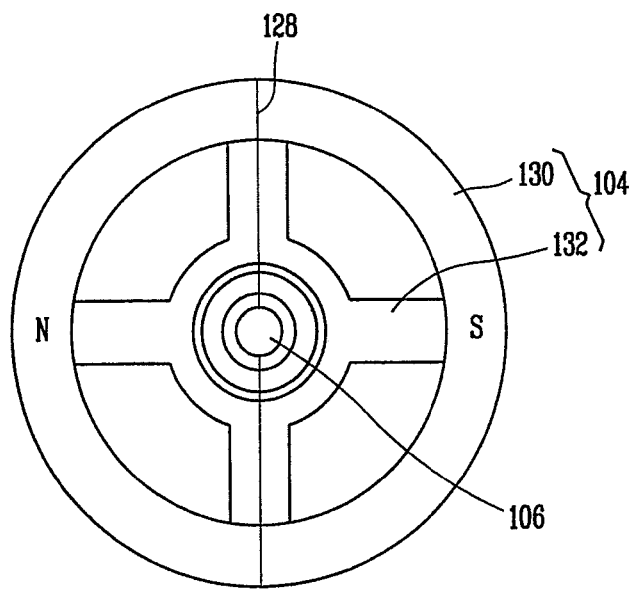
FIG. 4 is a front view of a rotor of the BLDC motor in accordance with the conventional art.
Figure 5:
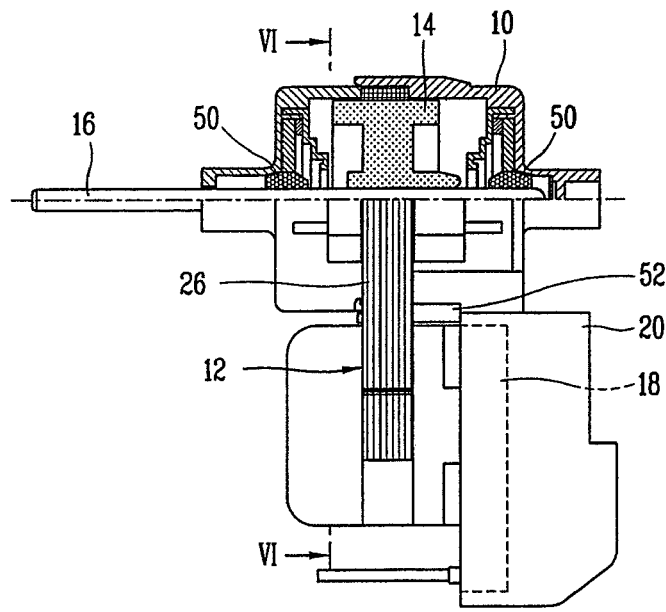
FIG. 5 is a cross-sectional view of a skeleton type BLDC motor in accordance with the present invention.
Figure 6:
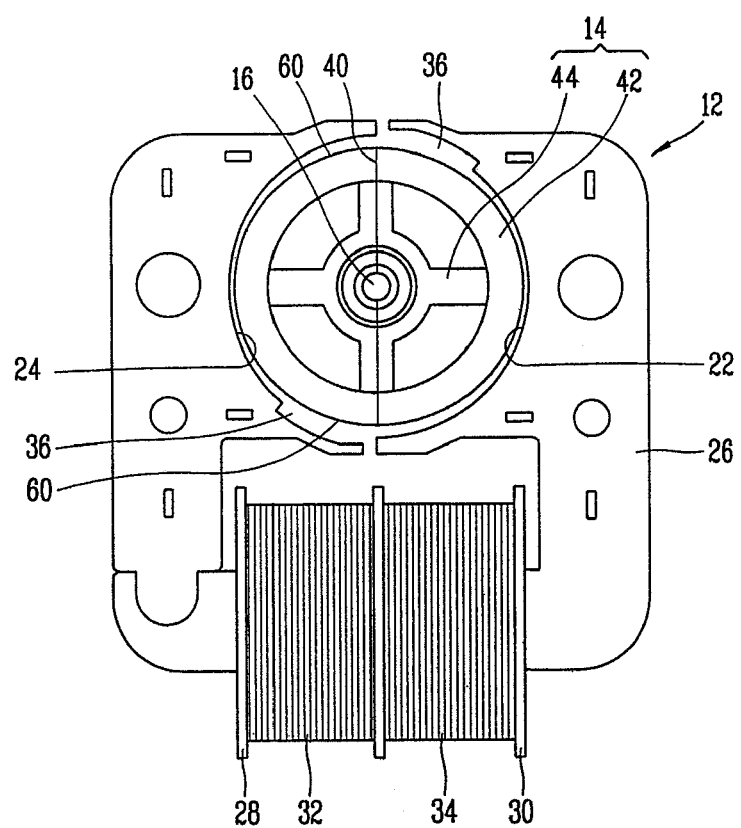
FIG. 6 is a cross-sectional view taken along line VI-VI of FIG. 5.

FIG. 5 is a cross-sectional view of a skeleton type BLDC motor in accordance with one embodiment of the present invention, and FIG. 6 is a cross-sectional view taken along line VI-VI of FIG. 5.

The BLDC motor of the present invention includes: a motor housing 1; a stator 12 which is fixed to the inside of the motor housing 10 and to which the power is applied; a rotor 14 disposed at an inner circumferential surface of the stator 12 with an air gap and rotated by interlocking with the stator 12; and a rotary shaft 16 mounted at the center of the rotor 14 and rotated together with the rotor 14, for transferring a rotational force to the outside.

A PCB 18 having a driver circuit 18 for driving the rotor 14 therein is installed at one side of the stator 10, and the PCB 18 is embedded in a PCB cover 20. A location detecting sensor (not shown) for detecting a rotary location of the rotor 14 is disposed at the PCB cover 20, and the location detecting sensor is received in a sensor receiving portion 52.

The stator 12 includes: a stator core 26 in which a plurality of sheets are laminated and coupled by a rivet and in which a first pole shoe 22 and a second pole shoe 24 which accommodate the rotor 14 are formed as one body; a pair of bobbins 28 and 30 fixed to the stator core 26; and a pair of coils 32 and 34 wound on the pair of bobbins 28 and 30, respectively, the pair of coils to which the power is alternately applied.

For the initial driving, a pair of detent grooves 36 disposed symmetrically to rotary shaft line of the rotor 12 are formed at the first pole shoe 22 and the second pole shoe 24A, respectively, in order that the rotor is not aligned at a position where torque of the rotor is zero.

A bearing 50 is mounted between the rotary shaft 16 and the motor housing 10, thereby rotatably supporting the rotary shaft.

Figure 7:
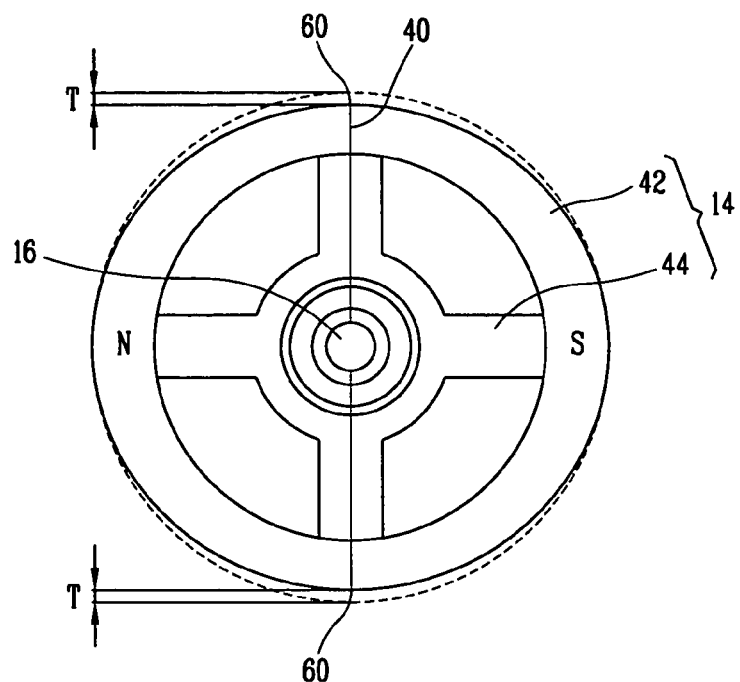
FIG. 7 is a front view of the skeleton type BLDC motor in accordance with the present invention.

As shown in FIG. 7, the rotor 14 includes: a disc-shaped magnet 42 whose one side is a north pole and the other side is a south pole on the basis of a magnetic pole separating line 40 which divides the rotor 14 into two parts across the center of the rotor 14; and a magnet frame 44 fixed to an inner circumferential surface of the magnet 42 and having the rotary shaft 16 fixed to its center.

Here, the rotor 14 is formed as an ellipse, and is made up of a semicircular north pole and a semicircular south pole.

Here, an air gap forming portion 60 is formed by removing both end portions of the rotor 14, through which the magnetic pole separating line 40 passes, from the round circular from as wide as T. As to the air gap forming portion 60, the diameter (L1) of the rotor 14 where the magnetic pole separating line 40 passes is shorter than the diameter (L) of the rotor 14 making a 90-degree angle from the magnetic pole separating line 40.

Preferably, the air gap forming portion 60 is formed such that the diameter is increased as it goes from the diameter (L1) of the rotor 14 through which the magnetic pole separating line 40 passes to the diameter (L) of the rotor 14 making a 90-degree angle from the magnetic pole separating line 40. In addition, the air gap forming portion 60 is preferably eccentric as much as 1~1.5 mm in the left and right direction from the center of the circle.

The air gap forming portion 60 allows a large air gap to be formed when the magnetic pole separating line 60 passes the detent groove 36 formed at the stator 12, thereby reducing higher degree of cogging torque.

An operation of the skeleton type BLDC motor in accordance with the present invention having such a construction will be described as follows.

If the power is applied to the motor, location information of the rotor 14 is detected by the location detecting sensor, and the driver circuit supplies the DC power to one of a pair of coils 32 and 34 on the basis of the detection result from the location detecting sensor. Then, the stator core 26 is magnetized, and rotates the rotor 14 by interaction with the rotor 14.

At this time, since the rotor 14 has the maximum air gap by the air gap forming portions 60 formed at the rotor 14 when the magnetic pole separating line 40, a separating line of the north pole and the south pole, passes the detent grooves 36 of the stator 12, higher degree of cogging torque is reduced.

Here, the cogging torque, which is a tangential force whose tendency is to move in equilibrium with the minimum magnetic energy, is generated by an air gap between the rotor and the stator regardless of the current. As magnetic energy corresponding to a minute change in rotation angle is changed into a form of sine wave, high-frequency cogging torque is effectively reduced. Thus, resonance noise can be reduced.

Figure 8:
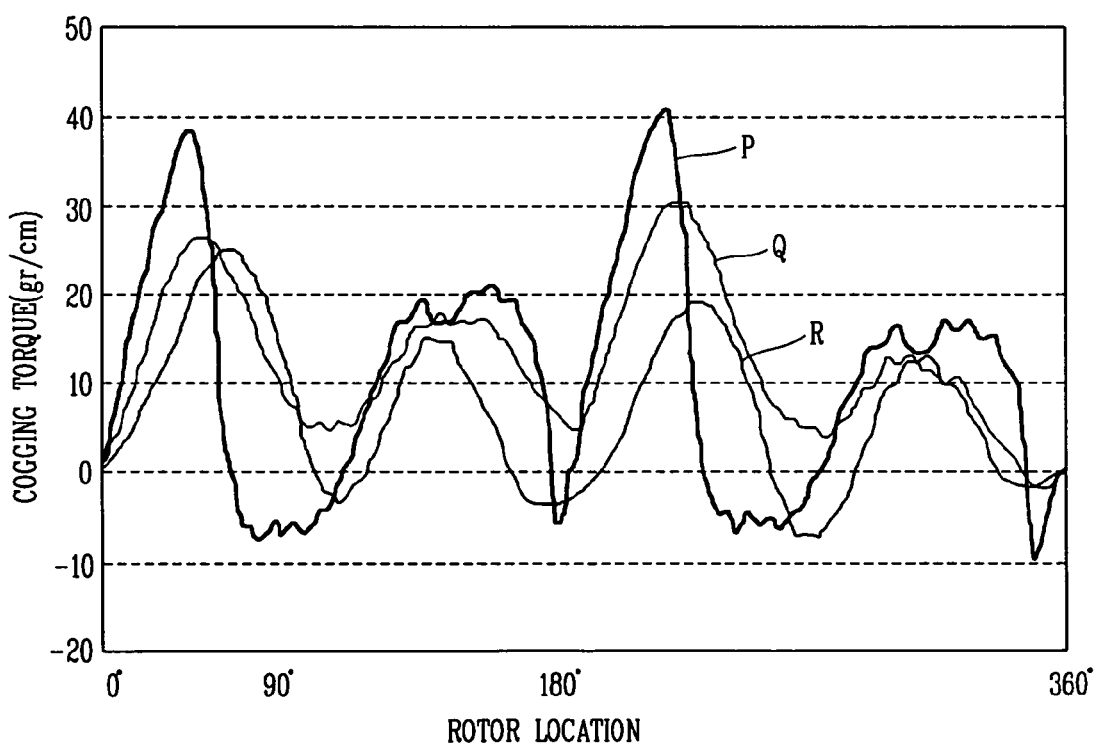
FIG. 8 is a graph showing a comparison between cogging torque of the conventional skeleton motor and cogging torque of the skeleton motor of the present invention.

FIG. 8 is a graph showing a comparison between cogging torque of the rotor of the conventional skeleton motor and cogging torque of the rotor of the skeleton motor of the present invention when the two rotors are rotated through 360 degrees.

As illustrated in graph of FIG. 8, it can be seen that the fourth degree or more of cogging torque, a component of high frequency, is reduced in measured values (P and Q) of cogging torque measured in the rotor 14 of the present invention in comparison to a measured value (P) of cogging torque measured in the conventional rotor 104.

Figure 9:
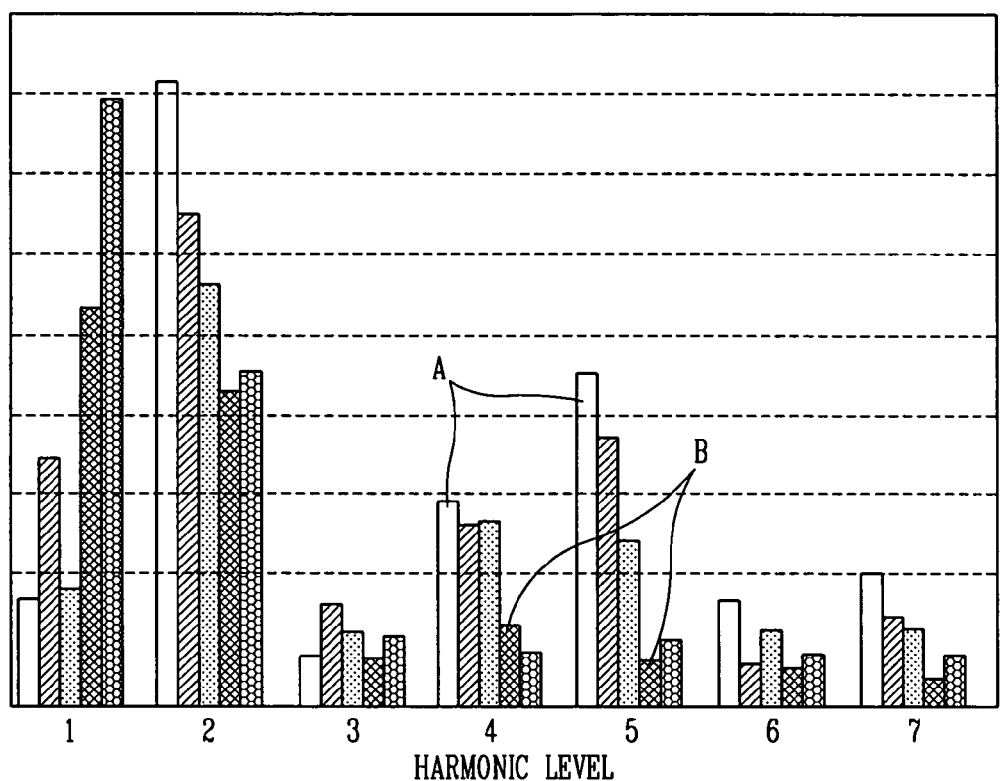
FIG. 9 is a graph showing a comparison between higher degree of cogging torque of the present invention and higher degree of conventional cogging torque.

FIG. 9 is a graph showing a comparison between higher degree of cogging torque of the present invention and higher degree of conventional cogging torque. It can be seen that cogging torque (B) of the present invention is lower than the conventional cogging torque (A). Especially, in such high level as harmonic level 4 or more, cogging torque of the present invention is reduced by 80% or more compared to the conventional one.

Figure 10:
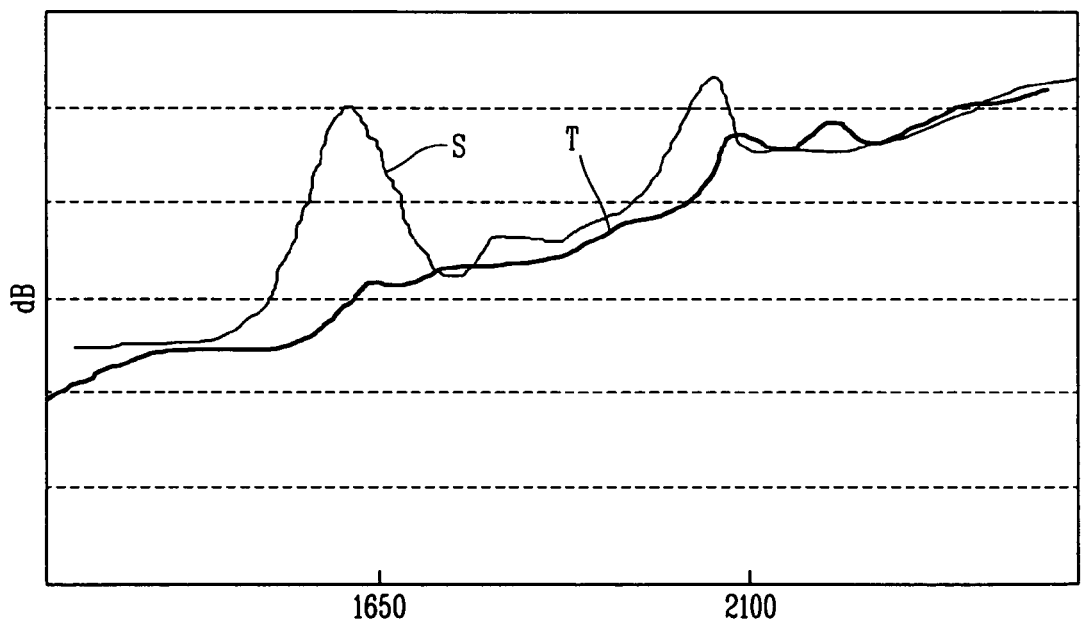
FIG. 10 is a graph showing a comparison between noise in the skeleton motor of the present invention and noise generated in the conventional skeleton motor.

FIG. 10 is a graph showing a comparison between noise generated in the skeleton motor of the present invention and noise generated in the conventional skeleton motor. It can be seen that noise (T) of the skeleton motor of the present invention is significantly lower than noise (S) of the conventional skeleton motor.

The skeleton type BLDC motor in accordance with the present invention having such a construction is provided with an air gap forming portion formed by removing both end portions of the rotor where the magnetic pole separating line dividing a north pole from a south pole of the rotor, and can reduce resonance noise by reducing higher degree of cogging torque by enlarging an air gap between the rotor and the detent grooves formed at the stator.

As the present invention may be embodied in several forms without separating from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A skeleton type BLDC motor, comprising:
    a rotor having an elliptic-cylindrical shape, comprising an elliptic-cylindrically-shaped magnet having a north pole and a south pole separated by a separation plane and a magnet frame fixed to an inner circumferential surface of the magnet, wherein a rotary shaft is fixed to a center of the magnet frame and a diameter of the rotor at points where the separation plane intersects an outer circumference of the rotor is smaller than a diameter of the rotor at all other points along the outer circumference of the rotor to minimize resonance noise resulting from a higher degree of cogging torque; and
    a stator in which the rotor is disposed, comprising a first pole shoe and a second pole shoe, a pair of detent grooves being formed in an inner surface of the stator,
    wherein a diameter of the rotor at points where a plane perpendicular to the separation plane intersects the outer circumference of the rotor is greater than the diameter of the rotor at all other points along the outer circumference of the rotor, and the diameter of the rotor at the points where the plane perpendicular to the separation plane intersects the outer circumference of the rotor is approximately 1 millimeter to 1.5 millimeters greater than the diameter of the rotor at the points where the separation plane intersects the outer circumference of the rotor.

2. The motor according to claim 1, wherein the motor comprises a two pole single-phase motor.

3. A motor, comprising:
    a rotor having an elliptical-cylindrical shape, comprising an elliptic-cylindrically-shaped magnet having a north pole and a south pole separated by a separation plane and a magnet frame fixed to an inner circumferential surface of the magnet, wherein a rotary shaft is fixed to a center of the magnet frame and a diameter of the rotor at points where the separation plane intersects an outer circumference of the rotor is smaller than a diameter of the rotor at all other points along the outer circumference of the rotor to minimize resonance noise resulting from a higher degree of cogging torque; and
    a stator in which the rotor is disposed,
    wherein a diameter of the rotor at points where a plane perpendicular to the separation plane intersects the outer circumference of the rotor is greater than the diameter of the rotor at all other points along the outer circumference of the rotor, and the diameter of the rotor at the points where the plane perpendicular to the separation plane intersects the outer circumference of the rotor is approximately 1 millimeter to 1.5 millimeters greater than the diameter of the rotor at the points where the separation plane intersects the outer circumference of the rotor.

4. The motor according to claim 3, wherein the motor comprises a two pole single-phase motor.

5. The motor according to claim 3, wherein a pair of detent grooves are symmetrically formed in an inner surface of the stator.

* * * * *